US010647359B2

(12) United States Patent
Viaux

(10) Patent No.: US 10,647,359 B2
(45) Date of Patent: May 12, 2020

(54) VEHICLE REAR BODY STRUCTURE AND METHOD FOR MANUFACTURING THEREOF

(71) Applicant: ArcelorMittal, Luxembourg (LU)

(72) Inventor: Ivan Viaux, Paris (FR)

(73) Assignee: ARCELORMITTAL, Luxembourg (LU)

( * ) Notice: Subject to any disclaimer, the term of this patent is extended or adjusted under 35 U.S.C. 154(b) by 31 days.

(21) Appl. No.: 15/779,897

(22) PCT Filed: Dec. 9, 2016

(86) PCT No.: PCT/IB2016/057503
§ 371 (c)(1),
(2) Date: May 30, 2018

(87) PCT Pub. No.: WO2017/098470
PCT Pub. Date: Jun. 15, 2017

(65) Prior Publication Data
US 2018/0362089 A1 Dec. 20, 2018

(30) Foreign Application Priority Data

Dec. 9, 2015 (WO) ............... PCT/IB2015/059487

(51) Int. Cl.
*B62D 21/15* (2006.01)
*B62D 25/08* (2006.01)
(Continued)

(52) U.S. Cl.
CPC ........... *B62D 21/152* (2013.01); *B62D 25/08* (2013.01); *B62D 25/2027* (2013.01); *B62D 65/02* (2013.01)

(58) Field of Classification Search
CPC .... B62D 21/152; B62D 25/08; B62D 25/087; B62D 25/2027
(Continued)

(56) References Cited

U.S. PATENT DOCUMENTS 8,276,966 B2 * 10/2012 Souma ................. B62D 43/10
296/187.11
9,862,420 B2 * 1/2018 Kato .................. B62D 25/2027
(Continued)

FOREIGN PATENT DOCUMENTS

CN         102390434 A      3/2012
DE     102010011267 A1      9/2011
(Continued)

OTHER PUBLICATIONS

The International Search Report issued in connection with International Application No. PCT/IB2016/057503 dated Mar. 16, 2017.
(Continued)

*Primary Examiner* — Gregory A Blankenship
(74) *Attorney, Agent, or Firm* — Davidson, Davidson & Kappel, LLC

(57) ABSTRACT

A vehicle rear body structure containing a rear rail extending in a longitudinal direction and a rear bumper beam, extending transversely to the longitudinal direction, the rear rail having a rear end and a front end, spaced apart along the longitudinal direction, the rear end being connected to the rear bumper beam and the rear rail extending towards the front of the vehicle from its rear end, wherein the rear rail comprises at least a front portion, an intermediate portion and a rear portion, the front portion being intended for extending alongside a fuel tank of the vehicle, the resistance to plastic deformation of the front portion being greater than the resistance to plastic deformation of the intermediate
(Continued)

portion, which is itself greater than the resistance to plastic deformation of the rear portion.

21 Claims, 2 Drawing Sheets

(51) Int. Cl.
  *B62D 25/20* (2006.01)
  *B62D 65/02* (2006.01)
(58) Field of Classification Search
  USPC .................................... 296/187.11, 203.04
  See application file for complete search history.

(56) References Cited

U.S. PATENT DOCUMENTS

| | | | |
|---|---|---|---|
| 2003/0090127 A1 | 5/2003 | Hidetsugu et al. | |
| 2008/0238146 A1 | 10/2008 | Saied et al. | |
| 2010/0096887 A1* | 4/2010 | Mori .................... | B62D 21/152 296/203.02 |
| 2010/0148538 A1* | 6/2010 | Neumann ............ | B62D 25/087 296/203.04 |
| 2011/0175401 A1* | 7/2011 | Fujimura ........... | B62D 25/2027 296/203.04 |
| 2013/0249243 A1* | 9/2013 | Lee ..................... | B62D 21/152 296/187.03 |
| 2014/0152053 A1 | 6/2014 | Watanabe et al. | |
| 2014/0239671 A1* | 8/2014 | Mori .................... | B62D 21/152 296/187.09 |
| 2016/0159400 A1* | 6/2016 | Matsuoka ........... | B62D 21/152 296/187.11 |
| 2016/0362139 A1* | 12/2016 | Sekiguchi ........... | B62D 21/152 |
| 2017/0291644 A1* | 10/2017 | Hasegawa ............. | B62D 21/15 |
| 2018/0361454 A1* | 12/2018 | Sohmshetty ......... | B21D 22/022 |
| 2018/0362089 A1* | 12/2018 | Viaux ................... | B62D 65/02 |
| 2019/0106151 A1* | 4/2019 | Berman ............... | B62D 21/152 |

FOREIGN PATENT DOCUMENTS

| | | |
|---|---|---|
| EP | 2733051 A1 | 5/2014 |
| WO | 2004098820 A1 | 11/2004 |
| WO | 2008102262 A1 | 8/2008 |

OTHER PUBLICATIONS

The International Search Report issued in connection with International Application No. PCT/IB2015/059487 dated Sep. 8, 2016.

* cited by examiner

VEHICLE REAR BODY STRUCTURE AND METHOD FOR MANUFACTURING THEREOF

FIELD OF THE INVENTION

The present invention relates to a vehicle rear body structure.

BACKGROUND OF THE INVENTION

Conventionally, the rear body structure of a vehicle includes a series of structures, located at the rear of the fuel tank, which are intended to absorb impact energy by deforming in response to an impact at the rear of the vehicle, and thus protect the fuel tank in the case of such an impact. These structures include a rear bumper beam and crash boxes, located between the rear ends of the rear rails of the rear body structure and the bumper beam.

The rear rails are located in front of the crash boxes. They conventionally have a resistance that is greater than that of the bumper beam and of the crash boxes and are intended for transferring the impact forces to the structural elements of the vehicle body. A front portion of the rear rails extends alongside the fuel tank of the vehicle, which is usually located at the rear end of the vehicle, in front of the wheel casings.

It appears that, in the case of high speed impacts on the rear of the vehicle, the conventional shock absorbing structures mentioned above may not sufficiently absorb the impact energy and the impact may result in a crushing of the rear rail(s). Such an uncontrolled crushing may result in an intrusion of some elements of the rear body structure into the gas tank, thus causing damage to the fuel tank, which might lead to spilling of the fuel and may ultimately result in an explosion of the vehicle. Therefore, damage to the fuel tank should be avoided, even in the case of high speed impacts.

BRIEF SUMMARY OF THE INVENTION

An object of the invention is to provide a vehicle rear body structure which provides for an improved crashworthiness in the case of a rear impact on the vehicle, and in particular which provides for an improved protection of the fuel tank in the event of such an impact.

The invention therefore provides a vehicle rear body structure comprising a rear rail extending in a longitudinal direction and a rear bumper beam, extending transversely to the longitudinal direction, the rear rail having a rear end and a front end, spaced apart along the longitudinal direction, the rear end being connected to the rear bumper beam and the rear rail extending towards the front of the vehicle from its rear end, wherein the rear rail comprises at least a front portion, an intermediate portion and a rear portion, the front portion being intended for extending alongside a fuel tank of the vehicle, the resistance to plastic deformation of the front portion being greater than the resistance to plastic deformation of the intermediate portion, which is itself greater than the resistance to plastic deformation of the rear portion, and wherein the vehicle rear body structure further comprises a guide structure intended for guiding the deformation of the rear rail so as to prevent a deformation thereof in a direction perpendicular to the longitudinal direction.

In certain embodiments, the guide structure is intended for guiding the deformation of the rear rail so as to prevent an upward deformation of the rear rail.

In certain embodiments, the guide structure comprises two legs intended for bearing vertically downwards on the guide rail in bearing areas spaced apart from each other.

In certain embodiments, one bearing area is located in the intermediate portion while the other bearing area is located in the front portion.

In certain embodiments, the product of the square of wall thickness of the front portion by the yield strength of the front portion is greater than the product of the square of the wall thickness of the intermediate portion by the yield strength of the intermediate portion, which is itself greater than the product of the square of the wall thickness of the rear portion by the yield strength the rear portion.

In certain embodiments, the yield strength of the front portion is greater than the yield strength of the intermediate portion, which is itself greater than the yield strength of the rear portion and/or the wall thickness of the front portion is greater than the wall thickness of the intermediate portion, which is itself greater than the wall thickness of the rear portion.

In certain embodiments, the rear portion is adjacent to the intermediate portion along the longitudinal direction and the intermediate portion is adjacent to the front portion along the longitudinal direction.

In certain embodiments, the rear portion is a press-hardened steel part having, after press-hardening, a yield strength $R_e$ comprised between 360 and 400 MPa or a press-hardened steel part having, after press hardening, a yield strength $R_e$ comprised between 700 and 950 MPa and the front portion is a press-hardened steel part having, after press hardening, a yield strength $R_e$ comprised between 950 and 1200 MPa or a press-hardened steel part having, after press hardening, a yield strength $R_e$ greater than 1260 MPa.

In certain embodiments, the rear portion is a press-hardened steel part having, after press-hardening, a yield strength $R_e$ comprised between 360 and 400 MPa and has a wall thickness of about 1.6 mm or a press-hardened steel part having, after press hardening, a yield strength $R_e$ comprised between 700 and 950 MPa having a wall thickness of about 1.4 mm.

In certain embodiments, the intermediate portion has a wall thickness of about 1.7 mm.

In certain embodiments, the front portion is a press-hardened steel part having, after press hardening, a yield strength $R_e$ comprised between 950 and 1200 MPa and has a wall thickness of about 1.7 mm or the front portion is a press-hardened steel part having, after press hardening, a yield strength $R_e$ greater than 1260 MPa and has a wall thickness of about 1.6 mm.

In certain embodiments, a front part of the intermediate portion is a press-hardened steel part having, after press hardening, a yield strength $R_e$ comprised between 700 and 950 MPa.

In certain embodiments, the rear portion of the rear rail comprises crumple zones to allow the rear rail to controllably deform during an impact.

In certain embodiments, the rear body structure further comprises a fuel tank, the front portion of the rear rail extending alongside the fuel tank.

In certain embodiments, the rear body structure comprises two rear rails, a rear intermediate transversal beam, a front intermediate transversal beam and a front transversal beam, the front intermediate transversal beam, the front transversal beam and the rear rails delimiting among themselves a frame for receiving the fuel tank, the front portion of the rear rails extending between the front transversal beam and the front intermediate transversal beam.

In certain embodiments, the front transversal beam extends between the front ends of the rear rails.

In certain embodiments, the front portion of the rear rails extends from the front transversal beam at least up to the front intermediate transversal beam.

The invention also provides a vehicle body comprising the vehicle rear body structure as defined above.

The invention also provides a method for manufacturing a rear body structure of a vehicle, the method comprising a step of manufacturing a rear rail, said step comprising successive steps of: providing a tailor welded blank, the tailor welded blank being obtained by welding together at least as many different blanks as there are portions having different compositions or thicknesses in the rear rail, each of these blanks having a composition and/or thickness depending on the desired properties of the corresponding rear rail portion; and forming this tailor welded blank into the desired shape. In some of these embodiments, the forming step is a step of hot forming the tailor welded blank, and said hot forming is followed by a step of cooling the hot formed tailor welded blank at a controlled cooling rate.

In certain embodiments of the method for manufacturing a rear body structure of a vehicle, at least two portions of the rear rail have the same composition and are subjected to a different heat treatment during or after forming so as to obtain a different yield strength in each portion.

BRIEF DESCRIPTION OF THE DRAWINGS

Other features and advantages of the invention will be better understood from reading of the following description, given with reference to the appended drawings, in which.

DETAILED DESCRIPTION OF THE INVENTION

In the following description, the terms inner, outer, front, rear, transversal, longitudinal, vertical, horizontal, top and bottom are construed with reference to the usual orientation of the illustrated elements, parts or structures when assembled on a vehicle structure, the vehicle lying on a horizontal plane.

Figure 1:
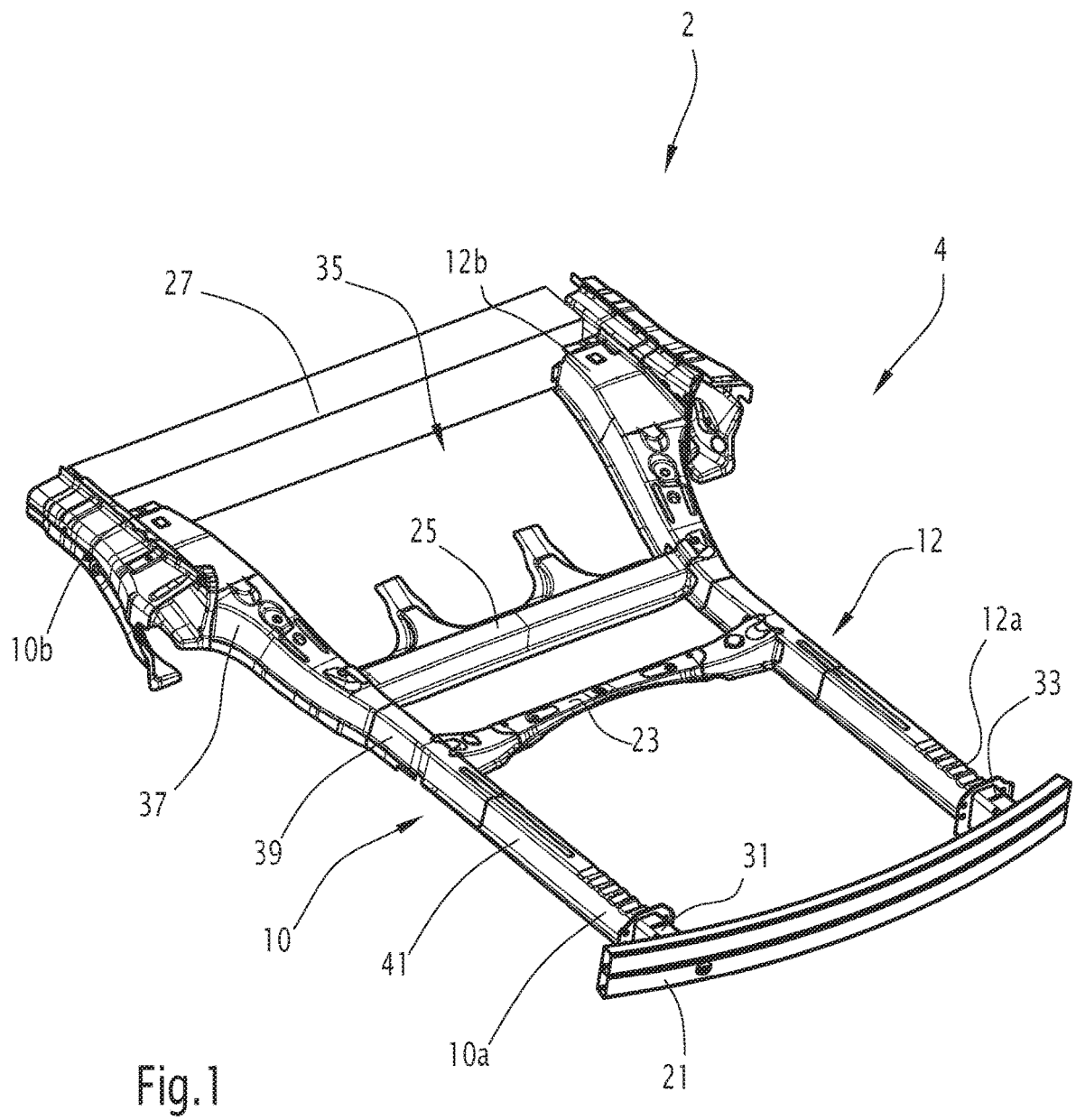
FIG. 1 is a perspective bottom view of a portion of a vehicle rear body structure according to a particular embodiment.

A vehicle rear body structure 2 according to an embodiment is illustrated on FIG. 1. The vehicle front body structure 2 may be a rear body structure of any kind of four wheel vehicle, in particular a front body structure of a unitized body.

The vehicle front body structure 2 comprises a frame assembly 4. The frame assembly 4 comprises two rear rails 10, 12 and a rear bumper beam 21.

Each rear rail 10, 12 extends substantially along the longitudinal direction of the vehicle. The rear rail 10 extends on one side of the vehicle in a front-rear direction of the vehicle body. It comprises a rear end 10a and a front end 10b. Similarly, the rear rail 12 comprises a rear end 12a and a front end 12b.

The rear bumper beam 21 extends substantially transversely to the longitudinal direction. It extends at the rear of the rear rails 10, 12. The rear end 10a, 12a of each rear rail 10, 12 is connected to the rear bumper beam 21, in particular through crash boxes 31, 33. More particularly, the rear bumper beam 21 bears longitudinally on the rear ends 10a, 12a of the rear rails 10, 12, in particular through said crash boxes 31, 33.

The front end 10b, 12b of each rear rail 10, 12 is connected to a structural element of the vehicle's body.

In the example shown in FIG. 1, the frame assembly 4 further comprises a rear intermediate transversal beam 23, a front intermediate transversal beam 25 and a front transversal beam 27.

The front transversal beam 27 extends between the front ends 10b, 12b of the rear rails 10, 12. It is intended for extending at the front of the wheel casings of the vehicle.

The rear and front intermediate transversal beams 23, 25 extend between the rear transversal beam 21 and the front transversal beam 27. They are connected to the rear rails 10, 12 at their lateral ends. The rear and front intermediate transversal beams 23, 25 are located at the wheel casings of the vehicle and reinforce the vehicle rear body in this area.

The front intermediate transversal beam 25, the front transversal beam 27 and the rear rails 10, 12 delimit among themselves a frame 35 intended for receiving the fuel tank of the vehicle. The fuel tank has not been shown in the drawings in order not to overly complicate the drawings.

The rear rails 10, 12 are provided as pairs in left-right symmetry with respect to the lateral direction. In the following, the description will be made with reference to the right rear rail 10, on the understanding that the same description applies to the left rear rail 12.

Figure 2:
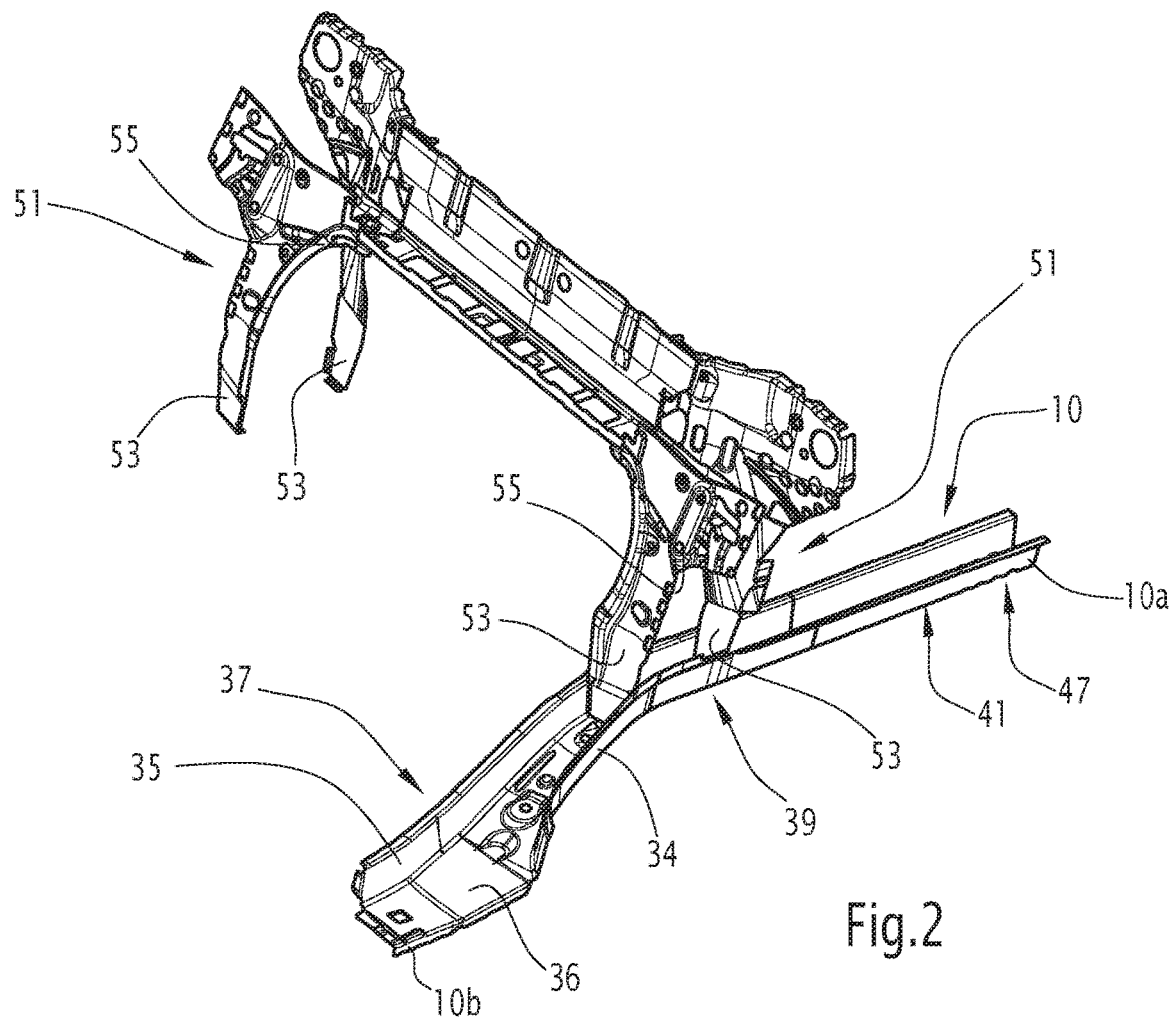
FIG. 2 is a perspective view of a portion of a vehicle rear body structure according to a particular embodiment.
Figure 3:
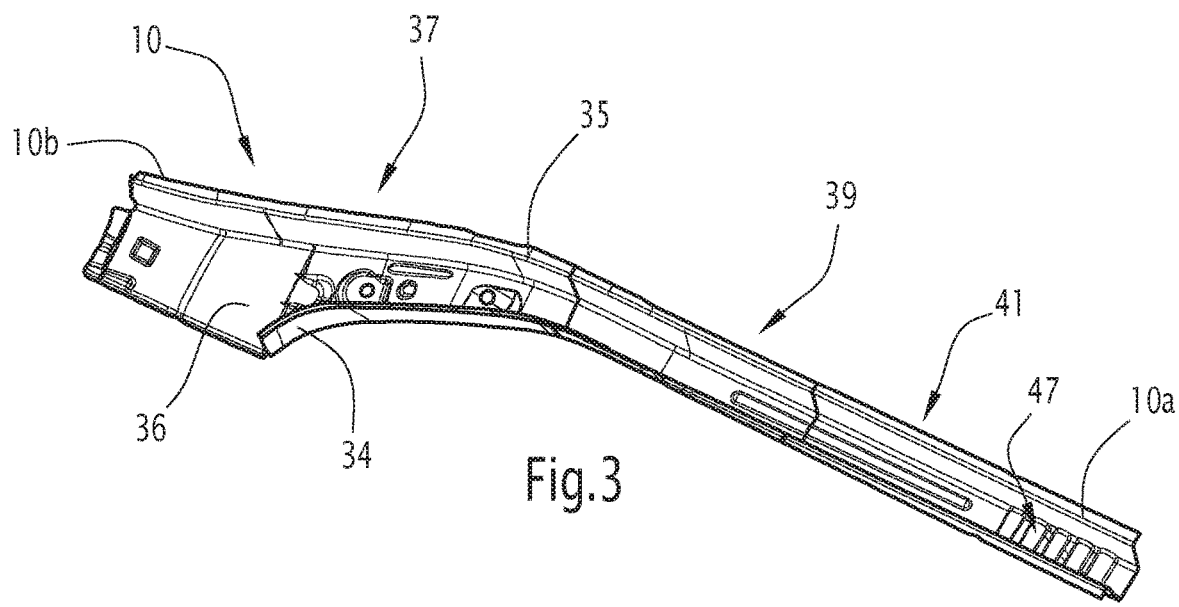
FIG. 3 is a perspective view of a rear rail of FIG. 2.

As can be seen on FIGS. 2 and 3, the rear rail 10 is substantially U-shaped. It comprises an outer flank 34, oriented towards the exterior of the vehicle, and an inner flank 35 parallel to the outer flank 34, oriented towards the interior of the vehicle. The rear rail 10 further comprises a bottom 36 oriented towards the bottom of the vehicle, the bottom being substantially orthogonal to the inner and outer flanks 34, 35. The U-shaped rear rail 10 opens upwardly.

The rear rail 10 extends in a substantially longitudinal direction. It comprises, from the front end 10b to the rear end 10a, a front portion 37, an intermediate portion 39 and a rear portion 41. The intermediate portion 39 extends the front portion 37 rearwards, and is itself extended rearwards by the rear portion 41. The front portion 37, intermediate portion 39 and rear portion 41 are adjacent to one another along the longitudinal direction.

In this example, the front end of the intermediate portion 39 is connected directly to the rear end of the front portion 37. The rear end of the intermediate portion 39 is connected directly to the front end of the rear portion 41.

The front portion 37 is intended for extending longitudinally alongside the fuel tank of the vehicle. Its front end forms the front end 10b of the rear rail 10. In the example shown in FIG. 1, the front portion 37 extends between the front transversal beam 27 and the front intermediate transversal beam 25. The front portion 37 is curved in a longitudinal plane extending substantially horizontally.

The intermediate portion 39 is substantially straight. It extends between the front portion 37 and the rear portion 41 along the longitudinal direction. In the example shown in FIG. 1, the intermediate portion 39 extends towards the rear of the vehicle rear body structure from the front intermediate transversal beam 25. In this example, the back intermediate transversal beam 27 extends transversely between the intermediate portions 39 of the rear rails 10, 12.

The rear portion 41 is substantially straight. The rear end of the rear portion 41 forms the rear end 10a of the rear rail 10.

Each of the rear portion 41, the intermediate portion 39 and the front portion 37 is U-shaped and comprises an inner wall, an outer wall and a bottom, which each form a section of the inner wall 35, the outer wall 34 and the bottom 36 of the rear rail 10.

The rear rail 10 is made of steel, for instance dual-phase steel or press hardened boron steel.

According to the invention, the front portion 37, the intermediate portion 39 and the rear portion 41 each have a different resistance to plastic deformation, the resistance to plastic deformation increasing from the rear end 10a of the rear rail 10 to the front end 10b of the rear rail 10.

More particularly, the resistance to plastic deformation of the front portion 37 is greater than the resistance to plastic deformation of the intermediate portion 39, which, in turn is greater than the resistance to plastic deformation of the rear portion 41.

The resistance to plastic deformation increases with increasing wall thickness t of the considered rear rail portion, as well as with increasing yield strength of the material forming said rear rail portion. More particularly, the resistance to plastic deformation of each portion of the rear rail 10 may be characterized by the product P of the square of wall thickness t of the considered portion of the rear rail 10 by the yield strength $R_e$ of said portion.

Advantageously, this product P increases from the rear end 10a to the front end 10b of the rear rail 10.

More particularly, the product P for the front portion 37 is greater than the product P of the intermediate portion 39 and the product P is greater than the product P of the rear portion 41. In other words, for each portion of the rear rail 10, the thickness t and the yield strength $R_e$ are chosen such that the product P increases from one section to the next from the rear to the front of the rear rail 10.

According to one particular embodiment, the yield strength $R_{ef}$ of the material forming the front portion 37 is greater than the yield strength $R_{ei}$ of the material forming the intermediate portion 39, which in turn, is greater than the yield strength $R_{er}$ of the material forming the rear portion 41. Thus, $R_{ef} > R_{ei} > R_{er}$.

For example, the yield strength $R_e$ of the steel forming the rear portion 41 may be comprised between 200 and 700 MPa, while the yield strength $R_e$ of the steel forming the intermediate section 39 is comprised between 300 and 1300 MPa and the yield strength $R_{ef}$ of the steel forming the front portion 37 is comprised between 400 and 1500 MPa.

In particular, the yield strength $R_{ef}$ of the material forming the front portion 37 is greater by at least 100 MPa than the yield strength of the material forming the rear portion 41.

As an alternative, the wall thickness t of the rear rail 10 increases from the rear end 10a to the front end 10b.

More particularly, the wall thickness $t_f$ of the front portion 37 is greater than the wall thickness $t_i$ of the intermediate portion 39, which is itself greater than the wall thickness $t_r$ of the rear portion 41. In other words, $t_f > t_i > t_r$.

For example, the thickness $t_f$ of the wall of the front portion 37 may be comprised between 1.4 and 3 mm, while the thickness $t_r$ of the wall of the intermediate portion 39 is comprised between 1.4 and 3 mm and the thickness $t_i$ of the wall of the rear portion 41 is comprised between 1 and 2 mm.

In particular, the wall thickness $t_f$ of the front portion 37 is greater by at least 0.4 mm than the wall thickness $t_r$ of the rear portion 41.

Advantageously, both the yield strength $R_e$ and the wall thickness t of the rear rail 10 increase from the rear end 10a to the front end 10b of the rear rail 10. More particularly, the following relationships apply: $t_f > t_i > t_r$ and $R_{ef} > R_{ei} > R_{er}$.

This gradual increase in the resistance to plastic deformation along the length of the rear rail 10 from the rear portion 41 to the front portion 37 results in an improved crashworthiness of the vehicle in the event of an impact at the rear of the vehicle.

Indeed, in the case of such an impact of sufficient strength, the rear portion 41 of the rear rail 10 will deform and absorb a considerable portion of the impact energy. Since the resistance to plastic deformation of the front portion 37 is greater than that of the rear portion 41, it will stay substantially intact as a result of the impact, thus preventing an intrusion of other components of the rear body structure into the fuel tank, alongside which the front portion 37 extends. This feature is important in order to avoid damage to the fuel tank due to an impact and fuel spillage possibly resulting therefrom, as well as to reduce the risk of explosion resulting from an impact at the rear of the vehicle. The intermediate portion 39, which has a resistance to plastic deformation that is intermediate between those of the front portion 37 and of the rear portion 41, deforms only once the rear portion 41 has been deformed, and, by deforming, absorbs impact energy and protects the front portion 37. It helps manage the plastic hinge between the rear portion 41 and the front portion 37 by keeping the front and intermediate portions 37, 39 of the rear rail 10 intact while the rear section is absorbing most of the crash energy by deforming at the earliest crash phase and avoiding unwanted material failure risk when the local plastic hinge occurs in a later phase of crash.

According to one embodiment, each of the front, rear and intermediate portions 37, 41, 39 has the same yield strength along its entire length.

For example, the rear portion 41 is a press-hardened steel part having, after press-hardening, a yield strength $R_e$ comprised between 360 and 400 MPa. It is more particularly made of a press-hardenable steel having a carbon content comprised between 0.04 wt. % and 0.1 wt. % and a manganese content comprised between 0.3 wt. % and 2.0 wt. %. Even more particularly, the steel composition of the rear portion 41 comprises in % weight: $0.04\% \leq C \leq 0.1\%$, $0.3\% \leq Mn \leq 2.0\%$, $Si < 0.3\%$, $Ti \leq 0.08\%$, $0.015 \leq Nb \leq 0.10\%$, Cu, Ni, Cr, $Mo \leq 0.1\%$, the remainder being iron and unavoidable impurities resulting from the elaboration. This rear portion 41 advantageously has a wall thickness of about 1.6 mm.

The rear portion 41 may also have a wall thickness of about 1.4 mm and be a press-hardened steel part having, after press hardening, a yield strength $R_e$ comprised between 700 and 950 MPa. More particularly, the rear portion 41 is made of a press-hardenable steel having a carbon content comprised between 0.06 wt. % and 0.1 wt. % and a manganese content comprised between 1.4 wt. % and 1.9 wt. %. Even more particularly, the steel composition of the rear portion 41 may further comprise Nb, Ti, B as alloying elements.

The front portion 37 has a wall thickness of about 1.7 mm. It is a press-hardened steel part having, after press hardening, a yield strength $R_e$ comprised between 950 and 1200 MPa. More particularly, it is made of a press-hardenable steel having a carbon content comprised between 0.20 wt. % and 0.25 wt. % and a manganese content comprised between 1.1 wt. % and 1.4 wt. %. Even more particularly, the steel composition of the front portion 37 comprises in % weight: $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, S≤0.005%, P≤0.025%, 0.002%≤B≤0.004%, the remainder being iron and unavoidable impurities resulting from the elaboration.

The front portion 37 may also have a wall thickness of about 1.6 mm and be made of a press-hardened steel part having, after press hardening, a yield strength $R_e$ greater than 1260 MPa. More particularly, the steel composition comprises for example, in % weight: 0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, %, the remainder being iron and unavoidable impurities resulting from the elaboration.

The intermediate portion 39 has a wall thickness of about 1.7 mm and be a press-hardened steel part having, after press hardening, a yield strength $R_e$ comprised between 700 and 950 MPa. More particularly, the intermediate portion 39 is made of a press-hardenable steel having a carbon content comprised between 0.06 wt. % and 0.1 wt. % and a manganese content comprised between 1.4 wt. % and 1.9 wt. %. Even more particularly, the steel composition of the intermediate portion 39 may further comprise Nb, Ti, B as alloying elements.

According to a second example of the rear rail 10, at least two portions among the portions 37, 39, 41 of the rear rail 10 may have the same thickness and the same composition, but different yield strengths, the difference in yield strength being obtained by subjecting the different portions to a different heat treatment.

For example, the front portion 37 and the intermediate portion 39 have a same thickness of 1.7 mm and the same composition. More particularly, the steel composition of the front portion 37 and the intermediate portion 39 comprises in % weight: 0.20%≤C≤0.25%, 1.1%≤Mn≤1.4%, 0.15%≤Si≤0.35%,≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration. However, the front portion 37 has a yield strength $R_e$ comprised between 950 and 1200 MPa, while the intermediate part 39 has a yield strength between 700 and 950 MPa.

As shown in FIG. 3, the rear rail 10 may comprise, in its rear portion 41, crumple zones 47 to allow the rear rail 10 to controllably deform during an impact. In this embodiment, the crumple zones 47 are formed only in a rear area of the rear portion 41, and particularly in the rear half of the rear portion 41.

The crumple zones may include, for example, apertures or cavities or ribs formed on the walls of the rear portion 41. In the embodiment shown in FIG. 3, the crumples zones 47 are formed by ribs formed in a bottom of the rear portion 41. The ribs extend transversely to the longitudinal direction, i.e. substantially vertically. They are substantially parallel to one another. In this example they are spaced regularly along the longitudinal direction and present a uniform width along the longitudinal direction. Each rib extends from the one lateral side to the other of the rear portion 41 of the rear rail 10.

In this example, the intermediate portion 39 and the front portion 37 do not comprise any crumple zones.

In the example shown in FIG. 2, the cross-sectional areas of the rear portion 41 and of the intermediate portion 39 are substantially constant. The cross-sectional area of the front portion 37 increases from its rear end to its front end. The cross-sectional area is taken in a transverse plane normal to the longitudinal direction. This feature also contributes to increasing the resistance to deformation of the front portion 37.

As can be seen on FIG. 2, the vehicle rear body structure 2 further comprises, for each of the rear rails 10, 12, a guide structure 51 configured for guiding the deformation of the corresponding rear rail 10, 12 during an impact at the rear of the vehicle. In particular, this guide structure 51 is configured for preventing a deformation of the rear rail 10, 12 along a direction perpendicular to the longitudinal direction, and more particularly along the vertical direction. The guide structure 51 is in particular configured for preventing part of the rear rail 10, 12 from moving upwards when subjected to impact forces along the longitudinal direction.

The guide structure 51 is therefore configured for retaining the rear rail 10, 12 against an upward deformation when subjected to impact forces along the longitudinal direction. Such an upward deformation would result in lower energy absorption by the rear portion 41 and more deformation of the front portion 37 causing higher unwanted intrusion in the fuel tank area.

The guide rail 10, 12 therefore deforms mainly along the longitudinal direction as a result of such impact forces.

For this purpose, each guide structure 51 comprises at least two legs 53 bearing upon the rear rail 10, 12 in bearing areas which are spaced apart along the longitudinal direction. The legs 53 extend along a direction substantially perpendicular to the longitudinal direction, and more particularly vertically. They extend above the rear rail 10, 12.

In the example shown in FIG. 2, the legs 53 have a bottom end and a top end. The bottom end of each leg 53 bears on the bottom 36 of the U-shaped rear rail 10. The legs 53 extend upwards from the rear rail 10 towards an upper structure of the vehicle body (not shown in the drawings), and in particular towards a floor element, extending transversely substantially between the wheel casings.

The top ends of the legs 53 are, in the example shown in FIG. 2, connected to each other through a connection element 55.

At its top end, the guide structure 51 is attached to said upper structure of the vehicle body, and in particular to the rear wheel casings and the rear floor of the vehicle body.

The bottom ends of the legs 53 are inserted into the U-shaped rear rail 10 so as to bear on the bottom 36 thereof and be located between the outer and inner flanges 34, 35. The legs 53 are further fixed to the rear rail 10 by any adapted fixing means.

In the example shown in FIG. 2, the guide structure 51 extends across the junction between the intermediate portion 39 and the front portion 37 so as to avoid any upwards deformation of the rear rail 10 in this area. More particularly, a front leg 53 of the guide structure 51 bears on the front portion 37 of the rear rail 10, while a back leg 53 of the guide structure 51 bears on the front portion 37 of the rear rail 10.

The positions of those legs 53 are highly limited to maximize the luggage compartment area.

From a crash management and car body torsional stiffness point of view, a connection of the legs 53 in the intermediate portion 39 of the rear rails 10, 12 ensures the highest possible energy absorption in high speed rear crash test and highest possible torsional stiffness.

At least two adjacent portions 37, 39, 41 of the rear rail 10 are connected to each other through a weld. According to one embodiment, all three portions 37, 39, 41 of the rear rail 10 are connected to each other through a weld.

Advantageously, the rear rail 10 is manufactured from a corresponding tailor welded blank, the tailor welded blank being obtained by welding, and in particular laser welding, of at least as many different blanks as there are portions having different compositions or thicknesses in the rear rail 10, 12, each of these blanks having a thickness and/or a composition depending on the desired properties of the corresponding rear rail portion.

For example, the tailor welded blank is obtained by welding together at least three blanks, each of these blanks corresponding to a portion 37, 39, 41 of the rear rail 10 and having a thickness and/or a composition depending on the desired properties of the corresponding portion 37, 39, 41 of the rear rail 10, 12.

More particularly, a method for manufacturing a rear rail 10 comprises the following successive steps:

welding together, in particular through laser welding, at least as many different blanks as there are portions having different compositions or thicknesses in the rear rail 10, 12, each of these blanks having a composition and/or thickness depending on the desired properties of the corresponding rear rail portion;

forming this tailor welded blank into the desired shape, in particular through drawing.

The step of forming the tailor welded blank is, in particular, a step of hot forming. The hot forming step is followed by a step of cooling of the part, i.e. of the hot formed tailor welded blank, at a controlled cooling rate.

In particular, depending on the desired final properties of each portion of the rear rail 10, these portions may be subjected to a different cooling treatment after forming of the blank. For example, the front portion 37 may be cooled at a higher cooling rate than the rear portion 41. In particular, the front portion 37 may be quenched, while the rear portion 41 is cooled more slowly so as to obtain the desired yield strength.

The skilled person, based on his general knowledge, is able to determine the cooling rate to be used depending on the desired yield strength of each portion of the rear rail 10.

Depending on the desired final properties of each section of the rear rail 10, these sections may be subjected to a different heat treatment during or after forming the blank into the half-shell 52, 54.

For example, if two adjacent portions have the same composition, but are intended to have different yield strengths in the final part, these different yield strengths may be obtained by one or a combination of the following methods:

during hot forming, the portion intended to have a lower yield strength is heated to a lower temperature than the portion intended to have a higher yield strength;

after hot forming, the portion intended to have a lower yield strength is cooled at a slower rate than the section intended to have a higher yield strength; and/or the portions are subjected to an identical hot forming and cooling after hot forming treatment, but the portion intended to have a lower yield strength is subsequently subjected to an additional heat treatment in order to decrease yield strength.

While the invention has been described in detail in connection with only a limited number of embodiments, it should be readily understood that the invention is not limited to such disclosed embodiments.

What is claimed is:

1. A vehicle rear body structure comprising a rear rail extending in a longitudinal direction and a rear bumper beam, extending transversely to the longitudinal direction, the rear rail having a rear end and a front end, spaced apart along the longitudinal direction, the rear end being connected to the rear bumper beam and the rear rail extending towards the front of the vehicle from its rear end, wherein the rear rail comprises at least a front portion, an intermediate portion and a rear portion, the front portion being intended for extending alongside a fuel tank of the vehicle, a resistance to plastic deformation of the front portion being greater than a resistance to plastic deformation of the intermediate portion, which is itself greater than a resistance to plastic deformation of the rear portion, and wherein the vehicle rear body structure further comprises a guide structure intended for guiding the deformation of the rear rail so as to prevent a deformation thereof in a direction perpendicular to the longitudinal direction.

2. The vehicle rear body structure according to claim 1, wherein the guide structure is intended for guiding the deformation of the rear rail so as to prevent an upward deformation of the rear rail.

3. The vehicle rear body structure according to claim 1, wherein the guide structure comprises two legs intended for bearing vertically downwards on the guide rail in bearing areas spaced apart from each other.

4. The vehicle rear body structure according to claim 3, wherein one bearing area is located in the intermediate portion while the other bearing area is located in the front portion.

5. The vehicle rear body structure according to claim 1, wherein a product of a square of a wall thickness of the front portion by a yield strength of the front portion is greater than a product of a square of a wall thickness of the intermediate portion by a yield strength of the intermediate portion, which is itself greater than a product of a square of a wall thickness of the rear portion by a yield strength the rear portion.

6. The vehicle rear body structure according to claim 1, wherein a yield strength of the front portion is greater than a yield strength of the intermediate portion, which is itself greater than a yield strength of the rear portion and/or a wall thickness of the front portion is greater than a wall thickness of the intermediate portion, which is itself greater than a wall thickness of the rear portion.

7. The vehicle rear body structure according to claim 1, wherein the rear portion is adjacent to the intermediate portion along the longitudinal direction and the intermediate portion is adjacent to the front portion along the longitudinal direction.

8. The vehicle rear body structure according to claim 1, wherein the rear portion is a press-hardened steel part having, after press-hardening, a yield strength $R_e$ comprised between 360 and 400 MPa or a press-hardened steel part having, after press hardening, a yield strength $R_e$ comprised between 700 and 950 MPa and the front portion is a press-hardened steel part having, after press hardening, a yield strength $R_e$ comprised between 950 and 1200 MPa or a press-hardened steel part having, after press hardening, a yield strength $R_e$ greater than 1260 MPa.

9. The vehicle rear body structure according to claim 8, wherein the rear portion has a wall thickness of about 1.6 mm when the yield strength $R_e$ is comprised between 360 and 400 MPa and the wall thickness is about 1.4 mm when the yield strength $R_e$ is comprised between 700 and 950 MPa.

10. The vehicle rear body structure according to claim 8, wherein the intermediate portion has a wall thickness of about 1.7 mm.

11. The vehicle rear body structure according to claim 8, wherein the front portion has a wall thickness of about 1.7 mm when the yield strength $R_e$ is comprised between 950 and 1200 MPa and the wall thickness is about 1.6 mm when the yield strength $R_e$ is greater than 1260 MPa.

12. The vehicle rear body structure according to claim 11, wherein a front part of the intermediate portion is a press-hardened steel part having, after press hardening, a yield strength $R_e$ comprised between 700 and 950 MPa.

13. The vehicle rear body structure according to claim 1, wherein the rear portion of the rear rail comprises crumple zones to allow the rear rail to controllably deform during an impact.

14. The vehicle rear body structure according to claim 1, further comprising the fuel tank, the front portion of the rear rail extending alongside the fuel tank.

15. The vehicle rear body structure according to claim 1, comprising two rear rails, a rear intermediate transversal beam, a front intermediate transversal beam and a front transversal beam, the front intermediate transversal beam, the front transversal beam and the rear rails delimiting among themselves a frame for receiving the fuel tank, the front portion of the rear rails extending between the front transversal beam and the front intermediate transversal beam.

16. The vehicle rear body structure according to claim 15, wherein the front transversal beam extends between the front ends of the rear rails.

17. The vehicle rear body structure according to claim 15, wherein the front portion of the rear rails extends from the front transversal beam at least up to the front intermediate transversal beam.

18. A vehicle body comprising a vehicle rear body structure according to claim 1.

19. A method for manufacturing the vehicle rear body structure according to claim 1, comprising a step of manufacturing the rear rail, said step comprising successive steps of:

providing a tailor welded blank, the tailor welded blank being obtained by welding together at least a first blank, a second blank and a third blank, each of the first blank, the second blank and the third blank having a composition and/or thickness depending on desired properties of a corresponding one of the front portion, the intermediate portion and the rear portion;

forming this tailor welded blank into a desired shape.

20. The method according to claim 19, wherein the forming step is a step of hot forming the tailor welded blank, said hot forming being followed by a step of cooling the hot formed tailor welded blank at a controlled cooling rate.

21. The method according to claim 19, wherein at least two of the front, intermediate and rear portions of the rear rail have a same composition and are subjected to a different heat treatment during or after forming so as to obtain a different yield strength in each of the at least two of the front, intermediate and rear portions.

* * * * *